Patented Dec. 19, 1950

2,534,717

UNITED STATES PATENT OFFICE 2,534,717

LIQUID COATING COMPOSITIONS

Edward L. Kropa, Old Greenwich, and George W. Barlow, Stamford, Conn., assignors to American Cyanamid Company, New York, N. Y., a corporation of Maine No Drawing. Application July 24, 1948, Serial No. 40,629

14 Claims. (Cl. 260—17)

This invention relates to liquid coating compositions and more particularly to flat (dull, matte) liquid coating compositions containing an organic flatting (flattening) agent. Specifically the invention is concerned with flat liquid coating compositions comprising a film-forming liquid and a finely divided (produced, for example, by grinding) acrylonitrile polymerization product containing at least 85% by weight thereof of combined acrylonitrile and which is substantially insoluble in the film-forming liquid. The polymeric or copolymeric acrylonitrile is an adjuvant for varnishes, lacquers, enamels and the like, and serves to dull the appearance of coatings obtained therefrom.

For many purposes it is desirable to coat surfaces with a protective and decorative finish which is more or less flat or dull instead of the more common, highly glossy finish. Examples of such applications are in the finishing of furniture and the painting of equipment for the military forces where a non-reflecting surface is desired.

Various gloss-reducing or flatting agents, both organic and inorganic, heretofore have been used or suggested as adjuvants in film-forming liquids in order to obtain a dry coating with the desired flat finish. Such adjuvants have included inorganic flatting agents, e. g., magnesia, magnesium carbonate, diatomaceous earth, asbestine and amorphous silica, the disadvantages of which are pointed out in, for instance, Laus Patent No. 2,396,051. Insoluble metallic soaps also have been employed as flatting agents, e. g., aluminum, magnesium and zinc stearates, the disadvantages of which are discussed in, for example, Miles Patent No. 2,214,771. Other adjuvants which have been used or suggested for use as flatting agents in film-forming liquids include the zinc, magnesium, aluminum and calcium soaps of oiticica oil acids (see Patent No. 2,214,771, supra); silica gels having an alcohol as at least the major portion of the liquid or continuous phase, which gels also are known as "silica alcogels" (see Healy Patent No. 2,377,840); certain organogels of an inorganic oxide, such as an oxide of silicon, aluminum, magnesium, titanium, tin, thorium, chromium, iron and nickel, and wherein an organic solvent, e. g., acetone, alcohol, etc., constitutes at least the major portion of the liquid or continuous phase (see Patent No. 2,396,051, supra); aerogels, specifically silica aerogels, which are formed by removing the continuous phase of a gel under such conditions that the surface tension of the liquid continuous phase is zero or very small (see Harford Patent No. 2,180,145); and organic flatting agents of the metal resinate type (see Auer Patents 2,418,450 and 2,433,833, the specifications of which also contain a rather complete discussion of methods of flattening liquid coating compositions and of the various kinds of flatting agents commonly used to secure this result).

The present invention is based on our discovery that acrylonitrile polymerization products of the kind described briefly in the first paragraph of this specification and more fully hereafter have particular and peculiar properties which render them eminently suitable for use as a flatting agent in a film-forming liquid material, that is, in a liquid material containing or comprising a base which, upon baking, drying or other operation, yields or is converted into a solid film upon the surface of the object to which the liquid film-forming or coating composition has been applied. For example, the acrylonitrile polymerization products are inert to attack by most chemicals, are unaffected by water, are substantially insoluble in the usual solvents employed in liquid coating compositions, and have a relatively low density. In view of their low density they can be used in smaller quantities than many of the conventional flatting agents and still obtain the desired flatting effect.

Polymeric and copolymeric acrylonitriles have still other properties which make them especially suitable for use as flatting agents in paints, varnishes, lacquers, enamels and other film-forming liquid coating compositions. For instance, the matter of obtaining satisfactory flatting of a coating composition comprising a catalyzed blend of alkyd and urea-formaldehyde resins has been a considerable problem in the past, and it has been necessary to avoid the use of many flatting agents in such compositions either because of their tendency to absorb the catalyst or to reduce the cure rate or because of their reactivity. In coating compositions of this kind, these difficulties are obviated by using an acrylonitrile polymerization product. More particularly we have found that in such compositions polymeric acrylonitrile was superior to all other conventional flatting agents which were tested, including the metallic soaps. For example, the metallic stearates prevented satisfactory curing of the resin film, as did also the aluminum soap of an adduct of maleic acid and rosin.

Since many dulled finishes are given a rubbing treatment after application to a surface, e. g., a desk top, it is necessary taht a bloom-free film be produced after rubbing. Acrylonitrile polymerization products, when incorporated into coating compositions as a flatting agent, impart to such compositions the ability to pass this test satisfactorily. Thus, flat liquid coating compositions containing polymeric or copolymeric acrylonitrile yield a brilliant, clear film after rubbing whereas unsatisfactory gray films result when other flatting agents, e. g., aluminum stearate, diatomaceous earth, etc., are used in a liquid coating composition which otherwise is the same.

Unlike some of the conventional flatting agents, e. g., the stearates, the acrylonitrile polymerization products used in practicing our invention do not degrade the toughness of the dried or baked film and may actually reinforce the film. Furthermore, the water resistance of films containing a small amount of a polymer or copolymer of acrylonitrile as a flatting agent is markedly superior to that of similar films containing other flatting agents, e. g., silica gel, magnesium carbonate, etc.

The remarkable flatting characteristics of acrylonitrile polymerization products can be utilized to advantage in pigmented paints and enamels. In such coating compositions the addition of a relatively small amount of polymeric or copolymeric acrylonitrile can be used to replace a larger amount of pigment, e. g., titanium dioxide, and still obtain the same degree of flatness as with the pigment alone; or, the flatness of a lowly pigmented paint or enamel can be improved by incorporating therein a small amount of an acrylonitrile polymerization product.

The polymeric and copolymeric acrylonitriles used in practicing our invention generally show little or no tendency to settle from film-forming liquid materials to which they have been added; or, if they do show any tendency to settle, they settle slowly to a soft, easily redispersible sediment. This is in marked contrast to that of many of the conventional flatting agents, e. g., silica gel, which, after it has settled, tends to pack to a dense mass. The ability of the acrylonitrile polymerization products to form a relatively stable suspension in liquid film-forming materials in which they have been dispersed, the volume loading which their low density permits and the aforementioned desirable characteristics constitute an unique and unobvious combination of properties which renders these polymeric materials eminently suitable for use as flatting agents in paints, varnishes, enamels, lacquers and other liquid film-forming materials or compositions including those of the oleoresinous type or kind.

Polymeric acrylonitrile and acrylonitrile copolymers containing at least 85% by weight thereof of combined acrylonitrile, that is, acrylonitrile polymerization products containing in the polymer molecules an average of at least 85% by weight of acrylonitrile, and which are substantially insoluble in the liquid component or vehicle of the film-forming liquids in which they are incorporated, are employed in practicing our invention. The acrylonitrile polymers and copolymers are prepared by methods now well known to those skilled in the art. In the case of copolymers, the polymerization rates of the individual monomers in a polymerizable mixture may be different, with the result that the proportions of the components in the final copolymer are different from the proportions thereof in the mixture of monomers which is polymerized. In preparing acrylonitrile copolymers which are used in carrying our invention into effect, the proportions of monomers in the polymerizable mixture from which the copolymer is made preferably are adjusted so that the final copolmer contains in the molecules thereof an average of at least 85% by weight of acrylonitrile, that is, the acrylonitrile polymerization product contains at least 85% by weight thereof of combined acrylonitrile. By the expressions "polymerization product containing in the polymer molecules an average of at least 85% by weight of acrylonitrile" and "acrylonitrile polymerization product containing at least 85% by weight thereof of combined acrylonitrile" as used herein and/or in the appended claims are meant a polymerization product (polymer, copolymer or interpolymer or mixture thereof) containing in its molecules an average of at least 85% by weight of the acrylonitrile unit, which is considered to be present in the individual polymer molecule as the group

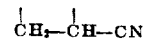

or, otherwise stated, at least 85% by weight of the reactant substance converted into and forming the polymerization product is acrylonitrile (combined acrylonitrile).

Illustrative examples of monomers which may be copolymerized with acrylonitrile to yield a polymerization product (copolymer or interpolymer) containing an average of at least 85% by weight of acrylonitrile are the unsaturated alcohol esters, more particularly the allyl, metallyl, crotyl, 1-chloroallyl, 2-chloroallyl, cinnamyl, vinyl, methvinyl, 1-phenylallyl, butenyl, propargyl, butynyl, etc., esters of saturated and unsaturated, aliphatic and aromatic, monobasic and polybasic acids such, for instance, as acetic, propionic, butyric, valeric, caproic, acrylic and alpha-substituted acrylic (including alkacrylic, e. g., methacrylic, ethacrylic, propacrylic, etc., and arylacrylic, e. g., phenylacrylic, etc.), crotonic, oxalic, malonic, succinic, glutaric, adipic, pimelic, suberic, azelaic, sebacic, maleic, fumaric, citraconic, mesaconic, itaconic, aconitic, benzoic, phenylacetic, phthalic, terephthalic, benzoylphthalic, etc., acids; the saturated monohydric alcohol esters, e. g., the methyl, ethyl, propyl, isopropyl, butyl, sec.-butyl, amyl, etc., esters of unsaturated aliphatic monobasic and polybasic acids, illustrative examples of which appear above; vinyl cyclic compounds (including monovinyl aromatic hydrocarbons), e. g., styrene, the various halogenostyrenes, alkylstyrenes, cyanostyrenes, etc., vinylnaphthalene, vinylcyclohexane, vinyl furane, vinyl pyridine, vinyldibenzofuran, divinyl benzene, allyl benzene, diallyl benzene, N-vinyl carbazole, the various alpha-substituted styrenes and alpha-substituted ring-substituted styrenes, e. g., alpha-methyl styrene, alpha-methyl-para-methyl styrene, etc.; unsaturated ethers, e. g., ethyl vinyl ether, diallyl ether, ethyl methallyl ether, etc.; unsaturated ketones, e. g., methyl vinyl ketone, methyl allyl ketone, etc.; methylene malonic esters, e. g., methylene methyl malonate, etc.; and unsaturated polyhydric alcohol (e. g., butenediol, butyndiol, etc.) esters of saturated and unsaturated, aliphatic and aromatic, monobasic and polybasic acids, illustrative examples of which appear above. Other examples of monomers which may be copolymerized with acrylonitrile in proportions such as hereinbefore indicated to yield copolymeric acrylonitrile compositions which may be used as flatting agents in film-forming liquid materials are given, for instance, in the copending application of John G. Erickson and Walter M. Thomas, Serial No. 34,143, filed June 19, 1948, and in the copending application of Edward L. Kropa, Serial No. 700,833, filed October 2, 1946 now Patent 2,510,503, which is mentioned in the aforementioned Erickson et al. application. In all cases the acrylonitrile copolymer employed as a flatting agent is one which is insoluble or substantially insoluble in the liquid component or vehicle of the film-forming liquid.

In the preparation of copolymeric acrylonitriles, the proportions of monomers in the polymerizable mixture may be varied as desired or as may be required in order to obtain a polymerization product containing in the polymer molecules an average of at least 85% by weight of acrylonitrile. Thus, when the polymerization rate of the monomers present in the polymerizable mixture is substantially the same, the proportions may be, for example, from, by weight, about 85% to about 99% of acrylonitrile to from about 15% to about 1% of the other comonomer. When the polymerizable mixture contains, in addition to the acrylonitrile, a monomer such, for example, as vinyl chloride, allyl alcohol, etc., which polymerizes at a rate different from that of acrylonitrile, then it may be necessary to subject to polymerization conditions a mixture in which the acrylonitrile constitutes as little as, for instance, 50 or 60% by weight thereof in order to obtain a polymerization product containing in the copolymer molecules an average of at least 85% by weight of acrylonitrile.

Any suitable method of polymerizing the monomeric acrylonitrile or mixture of monomers may be employed. One suitable method comprises polymerizing the monomer or mixture of monomers in an aqueous emulsion using a suitable polymerization catalyst, e. g., ammonium persulfate. Other polymerization methods, however, also may be used, e. g., methods such as those described in Bauer et al. Patent No. 2,160,054. The polymeric and copolymeric acrylonitriles employed in practicing our invention generally have a molecular weight of at least 10,000, more particularly within the range of 15,000 to 300,000 or higher, and advantageously the molecular weight is of the order of 20,000 or 25,000 to 140,000 or 150,000, as calculated from viscosity measurements by the Staudinger equation (reference: U. S. Patent No. 2,404,713).

The polymeric and copolymeric acrylonitrile flatting agents hereinbefore described may be used as adjuvants in oleoresinous varnishes or in any other liquid film-forming material, e. g., in liquid coating compositions (paints, varnishes, lacquers, enamels, etc.) wherein the film-forming base includes a cellulose derivative (e. g., nitrocellulose, water-insoluble cellulose ethers such, for instance, as ethyl cellulose, benzyl cellulose, etc., cellulose esters such, for example, as cellulose acetate, cellulose propionate, cellulose butyrate, cellulose acetopropionate, cellulose acetobutyrate, etc.); a synthetic resin, for instance a vinyl resin such as polyvinyl chloride, polyvinyl acetate, etc., an alkyd resin (e. g., a rosin-modified glyceryl phthalate resin, an oil-acid modified glyceryl phthalate resin, etc.), an aminoplast resin (e. g., an alkylated urea-formaldehyde resin, an alkylated melamine-formaldehyde resin, etc.), an oil-soluble phenoplast resin (e. g., a rosin-modified phenol-formaldehyde resin); a silicone resin; a drying or semi-drying oil or mixture thereof; a natural gum or resin (e. g., gum batu, gum damar, gum copal, gum kauri, gum karaya, gum manila, rosin, shellac, etc.); ester gums; and other film-forming bases used in the manufacture of paints, varnishes, lacquers, enamels and other liquid film-forming or coating compositions, as well as homogeneous mixtures or blends of different, compatible, film-forming bases such as those just mentioned by way of example, for instance, a blend of nitrocellulose and an alkyd resin compatible therewith, a blend of an aminoplast resin (e. g., a butylated urea-formaldehyde or melamine-formaldehyde resin) and an alkyd resin compatible therewith, etc. Other and more specific examples of film-forming bases and of liquid film-forming materials produced therefrom are given in the aforementioned Laus, Miles, Healy, Harford and Auer patents, any of the liquid coating compositions therein described being adapted for use in practicing the present invention by omitting all or a substantial part of the flatting agent employed or suggested by the patentee and using in its place an acrylonitrile polymerization product of the kind hereinbefore more fully identified. Any of the volatile solvents and other thinners used in the preparation of coating compositions, examples of which are given in the aforementioned patents and in the examples which follow may be used in the flat liquid compositions of our invention.

In producing the flat liquid coating compositions of the present invention the acrylonitrile polymerization product in finely divided or ground state is incorporated into the liquid film-forming material (e. g., a solution of a film-forming base dissolved in a volatile organic solvent) by any suitable method, such as any of those now commonly employed for incorporating other flatting agents into liquid coating compositions. For example, the finely divided polymeric or copolymeric acrylonitrile may be mixed and ground with other components of the coating composition in the proportion in which it is desired that the flatting agent be present in the finished coating composition; or, a concentrated paste containing the flatting agent may first be prepared by grinding or mixing the acrylonitrile polymerization product with a portion of the total liquid vehicle content of the coating composition and/or a portion of the solvent or thinner component of the coating composition, and then diluting the paste with the remainder of the liquid vehicle and/or solvent or thinner. Pebble mills, roller mills or any other suitable equipment may be employed in grinding or otherwise incorporating the flatting agent with or into the liquid coating composition or in forming a homogeneous blend or admixture of the same with other components of the composition. If the acrylonitrile polymerization product has not initially been separately ground to a particle size of 325 mesh (U. S. Standard Sieve Series) or finer prior to its incorporation into the liquid coating composition, it is usually ground at least to this degree of fineness, and generally to even a finer particle size, e. g., 50 to 150 millimicrons ($\mu$), during its incorporation into the liquid film-forming material or while being ground with components thereof.

From the foregoing it will be seen that a specific embodiment of our invention comprises a flatting composition which can be added to a film-forming liquid material, numerous examples of which have been given hereinbefore. This flatting composition, which is capable of imparting a flat finish to a film obtained from the resulting flatted composition, comprises a homogeneous mixture or blend of ingredients comprising (1) a ground acrylonitrile polymerization product containing at least 85% by weight of combined acrylonitrile, e. g., polymeric acrylonitrile, and (2) a liquid vehicle, e. g., an oil, a liquid resin, etc., which is compatible with the liquid component (solvent or thinner) of the said film-forming liquid material, the acrylonitrile polymerization product of (1) being substantially insoluble in the said liquid vehicle and liquid component.

The amount of acrylonitrile polymerization product which is incorporated into the flat liquid coating compositions of our invention may be varied as desired or as conditions may require, depending, for example, upon the particular polymeric or copolymeric acrylonitrile employed, the degree of flatness desired in the dried or baked film, the other components of the liquid film-forming material, etc. Ordinarily, however, when used as a dulling agent only, the amount of acrylonitrile polymerization product will be from about 0.2 to about 5% by weight of the finished liquid coating composition, but in some cases, as for example when the acrylonitrile polymerization product is to be used both as a dulling agent and as the sole pigment because of its intrinsic properties, it may constitute as much as 20 or 25% by weight of the finished coating composition.

In order that those skilled in the art better may understand how the present invention may be carried into effect, the following examples are given by way of illustration and not by way of limitation. All parts and percentages are by weight.

*Example 1*

| | Parts |
|---|---|
| ¼ sec. nitrocellulose (dry weight) | 100 |
| Alkyd resin, specifically a glyceryl phthalate resin modified with fatty acids comprising mainly lauric, oleic, palmitic and linoleic acids | 100 |
| Polyacrylonitrile | 7 |
| Dibutyl phthalate | 15 |
| Blown castor oil | 15 |
| Butyl alcohol | 120 |
| Butyl acetate | 240 |
| Ethyl acetate | 360 |
| Xylol | 480 |

The above ingredients were ground together for 4 hours in a small pebble mill. The resulting flat liquid coating composition contained 20% of non-volatile matter, and the viscosity of the strained composition was 25 seconds at 25° C. using a No. 4 Ford cup. A sample of the lacquer was sprayed on a filled and sealed wood panel. It dried down to a smooth, dull sheen having a gloss rating of 35–40 on a 60° Gardner glossometer. The clarity of the dried film was excellent, and its toughness was satisfactory.

*Example 2*

A white pigmented enamel was prepared by grinding together the following ingredients for 18 hours in a pebble mill:

| | Parts |
|---|---|
| Alkyd resin solution [1] | 150.0 |
| Titanium dioxide | 85.0 |
| Polyacrylonitrile | 15.0 |
| Mineral spirits (Varsol No. 1) | 50.0 |
| Cobalt naphthenate | See (a) |
| Calcium naphthenate | See (b) |

[1] Solution of 35% mineral spirits and 65% of pentaerythritol phthalate polyester modified with fatty acids of soya bean oil.
(a) 0.04% as metallic cobalt based on the alkyd resin solids.
(b) 0.08% as metallic calcium based on the alkyd resin solids.

The enamel was applied to wall surfaces over a dried flat wall paint. It dried to a very flat finish as compared with the gloss of enamel of similar formulation but from which the polyacrylonitrile had been omitted. The pigment loading in the enamel of this example is very low in comparison with the heavily pigmented products normally made for coating applications where a flat enamel finish is wanted.

*Example 3*

| | Parts |
|---|---|
| Solution of butylated urea-formaldehyde resin (55% resin solids, 45% of a 50-50 solvent mixture of butanol and xylene) | 100.0 |
| Solution of a glyceryl phthalate resin modified with rosin and linseed oil acids (50% resin solids, 50% xylene) | 100.0 |
| Catalyst (solution of 40% methyl acid pyrophosphate dissolved in a solvent comprising mainly butanol) | 5.0 |
| Xylene | 20.0 |
| Butanol | 20.0 |
| Flatting agent | 7.5 |

Finely divided polyacrylonitrile and other flatting agents, specifically silica gel, metallic stearates, and an aluminum soap of a maleic acid-rosin adduct, were ground into the above composition, which is a low-bake furniture finish, using regular pebble mill technique. After grinding for 24 hours, they were adjusted to give a gloss rating of 80 on the 60° Gardner glossometer. Unlike the metallic stearates, specifically aluminum stearate, and the aluminum soap of an adduct of maleic acid and rosin, which prevented curing of films of the finish, the polyacrylonitrile did not inhibit or prevent curing. Furthermore, unlike the finish containing silica gel as a flatting agent, which finish had very poor water resistance, the finish containing the polyacrylonitrile had excellent water resistance.

*Example 4*

To a base gloss lacquer composed of 200 parts of the same alkyd resin used in Example 1 and 100 parts of ¼ second nitrocellulose dissolved in a solvent combination of 10% butyl alcohol, 20% butyl acetate, 30% ethyl acetate and 40% toluene was added 10 parts of polyacrylonitrile. Similar compositions were prepared using the same amount of silica gel and aluminum stearate. The three compositions were separately ground by the usual pebble mill technique. After grinding for 24 hours the lacquers were reduced to spraying consistency by adding the above solvent combination and were adjusted to a gloss reading of 79–81 on the 60° Gardner glossometer by adding further quantities of the base gloss lacquer. The percentages (based on the total non-volatile content of the lacquers) of each flatting agent necessary to obtain this gloss range are as follows:

| | Percent |
|---|---|
| Polyacrylonitrile | 1.15 |
| Aluminum stearate | 2.31 |
| Silica gel | 1.12 |

The amount of polyacrylonitrile required to give the same flatting effect is approximately the same as that required with silica gel, but the former has the advantage over the latter, among other benefits, in that it provides a dried film having greatly improved resistance to water.

The flatting effect of the polyacrylonitrile is approximately twice that of the aluminum stearate.

The foregoing lacquers were maintained at about 130° F. for 96 hours in order to observe their tendencies toward gelation, settling and agglomeration. In the lacquer containing the silica gel, the silica gel settled to a soft sediment which had a tendency to flocculate upon stirring. In the lacquer which contained the aluminum stearate, the aluminum stearate dissolved and lost all its flatting effect. In marked contrast, the polyacrylonitrile in the lacquer which contained this flatting agent settled to a soft sediment which dispersed readily upon stirring. Furthermore, the polyacrylonitrile showed no flocculation tendencies on stirring and no evidence of dissolution. These results show that a liquid coating composition containing an acrylonitrile polymerization product is not detrimentally affected by prolonged heating at an elevated temperature, specifically about 130° F. The liquid coating compositions of our invention, therefore, may be exposed to elevated temperatures of the order of 100° F. to 150° F. for a prolonged period, such as may be encountered during shipment in hot box cars or during storage in hot warehouses, without affecting the polyacrylonitrile flatting agent or without detrimentally affecting the coating composition or causing difficulty in its subsequent use.

The flat liquid coating compositions of this invention may be used wherever it is desired to obtain a dull or flat finish on articles, for instance in coating floors, furniture, military equipment, aircraft, etc. The acrylonitrile polymerization products may be used as flatting agents in both clear and pigmented varnishes. They may be used alone or in conjunction with conventional flatting agents, such as metallic stearates, silica gel, etc., in order to fortify the latter. They also may be employed in coating compositions as carriers for dyes or other coloring matter. Alternatively, the acrylonitrile polymerization products may be used in coating compositions along with other colored pigments.

Certain of the acrylonitrile polymerization products also may be employed in the flatting of artificial fibers such, for example, as the various rayon and other fibers made by wet spinning processes. Thus, while polyacrylonitrile is insoluble in all the common organic liquids used in film-forming applications, the polymer is swollen by a number of the powerful solvents used in the fiber-spinning industry. Hence, in order to overcome any partial swelling or solution of the acrylonitrile polymerization product in such specialized applications, copolymers of acrylonitrile advantageously may be employed, more particularly those in which a minor amount of a copolymerizable material capable of yielding a cross-linked, substantially infusible copolymer is used in the preparation of the copolymer. Examples of such copolymerizable materials are divinyl benzene, diallyl phthalate, diallyl fumarate, glycol fumarate polyesters, etc.

We claim:

1. A flat liquid coating composition including (1) a liquid comprising a film-forming base and (2) a finely divided acrylonitrile polymerization product containing at least 85% by weight thereof of combined acrylonitrile, said film-forming base being different from said acrylonitrile polymerization product of (2), and the said acrylonitrile polymerization product being substantially insoluble in the said flat liquid coating composition.

2. A flat liquid coating composition including (1) a liquid comprising a film-forming base and (2) a flatting agent comprising finely divided polymeric acrylonitrile, said polymeric acrylonitrile constituting from about 0.2% to about 25% by weight of the said liquid coating composition and being substantially insoluble therein, and said film-forming base being different from said polymeric acrylonitrile.

3. A flat liquid coating composition as in claim 2 wherein the polymeric acrylonitrile has a molecular weight of at least 10,000.

4. A flat liquid coating composition comprising (1) a clear varnish including a liquid containing a film-forming base and (2) a flatting agent comprising finely divided polymeric acrylonitrile, said polymeric acrylonitrile constituting from about 0.2% to about 25% by weight of the said liquid coating composition and being substantially insoluble therein, and said film-forming base being different from said polymeric acrylonitrile.

5. A flat liquid coating composition comprising nitrocellulose, a solvent therefor and a flatting agent comprising finely divided polymeric acrylonitrile dispersed throughout the said coating composition, said polymeric acrylonitrile constituting from about 0.2% to about 25% by weight of the said liquid coating composition and being substantially insoluble therein.

6. A flat liquid coating composition comprising an alkyd resin and a flatting agent comprising finely divided polymeric acrylonitrile dispersed throughout the said coating composition, said polymeric acrylonitrile constituting from about 0.2% to about 25% by weight of the said liquid coating composition and being substantially insoluble therein.

7. A flat liquid coating composition comprising (1) nitrocellulose, (2) an alkyd resin compatible with the said nitrocellulose, (3) a thinner and (4) finely divided polymeric acrylonitrile as a flatting agent, said polymeric acrylonitrile constituting from about 0.2% to about 5% by weight of the said liquid coating composition and being substantially insoluble therein.

8. A flat liquid coating composition comprising an aminoplast resin and a flatting agent comprising finely divided polymeric acrylonitrile dispersed throughout the said composition, said polymeric acrylonitrile constituting from about 0.2% to about 25% by weight of the said liquid coating composition and being substantially insoluble therein.

9. A flat liquid coating composition as in claim 8 wherein the aminoplast resin is a urea-formaldehyde resin.

10. A flat liquid coating composition comprising (1) an aminoplast resin, (2) an alkyd resin compatible with the resin of (1), (3) a thinner and (4) finely divided polymeric acrylonitrile as a flatting agent, said polymeric acrylonitrile constituting from about 0.2% to about 25% by weight of the said liquid coating composition and being substantially insoluble therein.

11. A flatting composition in concentrated form and which is capable of dilution to form a flat liquid coating composition, said flatting composition in concentrated form comprising (1) a liquid containing a film-forming base and (2) a finely divided acrylonitrile polymerization product containing at least 85% by weight of combined acrylonitrile, said film-forming base being different from said acrylonitrile polymerization product of (2), and the said acrylonitrile polymerization product being substantially insoluble in the said flatting composition in concentrated form and in the flat liquid coating composition produced from said concentrated flatting composition.

12. A flatting composition as in claim 11 wherein the acrylonitrile polymerization product is polymeric acrylonitrile.

13. A flat liquid coating composition as in claim 1 wherein the particle size of the acrylonitrile polymerization product is at least 325 mesh.

14. A flat liquid coating composition as in claim 2 wherein the particle size of the polymeric acrylonitrile is from 50 to 150 millimicrons.

EDWARD L. KROPA.
GEORGE W. BARLOW.

REFERENCES CITED

The following references are of record in the file of this patent:

UNITED STATES PATENTS

| Number | Name | Date |
|---|---|---|
| 2,404,713 | Houtz | July 23, 1946 |
| 2,404,720 | Houtz | July 23, 1946 |